(12) United States Patent
Gadamus et al.

(10) Patent No.: US 6,720,527 B2
(45) Date of Patent: Apr. 13, 2004

(54) POWER CORD FOR A WELDING-TYPE POWER SUPPLY

(75) Inventors: Jeffery J. Gadamus, Hortonville, WI (US); Richard Mark Achtner, Neenah, WI (US); Michael A. Sammons, Appleton, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/884,304

(22) Filed: Jun. 19, 2001

(65) Prior Publication Data

US 2002/0190042 A1 Dec. 19, 2002

(51) Int. Cl.[7] ............................. B23K 9/10; H01R 29/00
(52) U.S. Cl. ..................... 219/130.1; 219/136; 439/518
(58) Field of Search ..................... 219/136, 130.1; 439/52, 172, 173, 518, 956

(56) References Cited

U.S. PATENT DOCUMENTS

| | | | |
|---|---|---|---|
| 1,275,693 A | 8/1918 | Hubbell | |
| 2,417,928 A | 3/1947 | Guernsey | |
| 2,450,657 A | 10/1948 | Guernsey | |
| 2,989,719 A | 6/1961 | Aarlaht | |
| 3,025,486 A | 3/1962 | Falconer | |
| 3,382,475 A | 5/1968 | Kramer | |
| 3,996,546 A | 12/1976 | Hugly | |
| 4,131,805 A | * 12/1978 | Austin et al. | 307/147 |
| 4,273,409 A | 6/1981 | Blanche et al. | |
| 4,815,983 A | * 3/1989 | Erickson et al. | 439/173 |
| 4,856,999 A | 8/1989 | Flohr | |
| 4,911,649 A | 3/1990 | Helmich, Jr. | |
| 4,997,381 A | 3/1991 | Oh | |
| 5,319,533 A | * 6/1994 | Reynolds et al. | 363/17 |
| 5,446,641 A | 8/1995 | Reynolds et al. | |
| 5,540,596 A | 7/1996 | Bothe et al. | |
| 5,601,741 A | 2/1997 | Thommes | |
| 5,684,689 A | * 11/1997 | Hahn | 363/146 |
| 5,791,921 A | * 8/1998 | Lee | 439/172 |
| 5,930,122 A | * 7/1999 | Moriguchi et al. | 363/17 |
| 6,002,103 A | 12/1999 | Thommes | |

* cited by examiner

Primary Examiner—M. Alexandra Elve
Assistant Examiner—Kevin P. Kerns
(74) Attorney, Agent, or Firm—John H. Pilarski; Mark W. Croll (57) ABSTRACT

A power cord assembly for a welding-type power supply includes a power cord and a plurality of adaptors. The power cord is adapted for attachment to the welding-type power supply and is capable of providing any of a plurality of input voltage signals to the welding-type power supply via the plurality of adaptors.

28 Claims, 5 Drawing Sheets

POWER CORD FOR A WELDING-TYPE POWER SUPPLY

FIELD OF THE INVENTION

The present invention relates generally to power cords for welding-type power supplies. More specifically, it relates to power cords capable of providing a plurality of input voltages to a welding-type power supply.

BACKGROUND OF THE INVENTION

Power supplies typically convert a power input signal into a necessary or desirable power output signal tailored for a specific application. In welding applications, for instance, a welding power supply typically receives a high voltage alternating current (AC) input signal and converts it into a high direct current (DC) or alternating current (AC) welding output signal. The high voltage AC input signal is typically a line voltage provided by a power utility through a wall outlet.

Many different line input voltage signals are available from power utilities including signals having approximate voltages values of 110/115V, 200/208V, 230/240V, 380/415V, 460/480V, 500V and 575V. The actual line input voltage signals that are available vary from country to country, can be either single-phase or three-phase, can have different current ratings and can be either 50 or 60 Hz signals.

As used herein, two input voltage signals are different from each other if any one of the parameters described above (e.g. voltage value, phase relationship, current rating or frequency) is different. Two input voltage signals are the same if they have the same voltage value, phase relationship, current rating and frequency.

Typically, a different standardized electrical interface configuration (e.g., also called wall outlet configuration or plug and socket configuration) is used to receive each of these available line input voltage signals. For instance, one standardized electrical interface configuration is typically required to receive a 60 Hz single-phase 115 volt line input signal rated at 20 amperes while a different standardized electrical interface configuration is typically required to receive a 60 Hz single-phase 230 volt line input signal rated at 20 amperes. Similarly, a third standardized electrical interface configuration different from the other two standardized electrical interface configurations is typically required to receive a 60 Hz single-phase line input signal having a voltage of 115 volts and a current rating of 15 amperes. To complicate matters, the standardized electrical interface configurations for the same line input voltage signal may vary from country to country.

Many prior art welding-type power supplies (e.g. welding power supplies, plasma cutters and induction heaters) have the capability of converting a plurality of different line input voltage signals into a welding-type output signal. For example, some of these prior art welding-type power supplies are designed to receive only certain line input voltage values while others can receive any line input voltage value within a range of input voltage values.

With some of these power supplies, the operator first identifies the input voltage value to be received and then manually adjusts the circuitry of the welding-type power supply to accommodate that particular input voltage value. Other more sophisticated prior art welding-type power supplies have the capability to sense or determine the input voltage value being received and automatically adjust the welding-type power supply's circuitry to convert the actual input voltage signal being received into a welding-type output signal.

All of these prior art welding-type power supplies suffer from one drawback however. They all receive the line input voltage signal from the power utility via a wall outlet through a power cord attached at one end to the welding-type power supply. The other end of the power cord includes a plug configured to interface and receive only one particular line input voltage signal. In order to receive a different desired line input voltage signal, the plug end of the power cord must be modified. Modification typically involves cutting off the existing plug and replacing it with a new plug that is properly configured to receive the different desired line input voltage signal. Alternatively, the entire power cord is replaced with a different cord having a plug that is properly configured to receive the different desired line input voltage signal.

Thus, although the internal circuitry of these prior art welding-type power supplies has the capability to receive and convert a plurality of line input voltage signals into a welding-type output signal, the prior art power cords which supply these welding-type power supplies with the line input voltage signals are not configured to provide a plurality of line input voltage signals to these welding-type power supplies. Rather, the prior art power cords must be modified or replaced each time a different line input voltage signal is desired or available.

It is desirable, therefore, to have a power cord that is capable of providing a plurality of different input voltage signals to a welding-type power supply to allow the welding-type power supply circuitry to be fully utilized. Preferably, the power cord can be easily reconfigured in the field to receive any of a plurality of different line input voltage signals without the need for modifications to the power cord and without the need for replacement of the power cord.

SUMMARY OF THE PRESENT INVENTION

According to a first aspect of the invention, a welding-type apparatus includes a power cord and a welding-type power supply attached to the power cord. The power cord is capable of providing any of a plurality of input voltage signals to the welding-type power supply. The power cord is configured to interface with a first adaptor configured to receive a first input voltage signal from the plurality of input voltage signals and a second adaptor configured to receive a second input voltage signal from the plurality of input voltage signals. The second input voltage signal is different from the first input voltage signal.

The welding-type power supply is configured to convert any of the plurality of input voltage signals received from the power cord into a welding-type output signal in one embodiment. The power cord is configured to removably mate with the first and second adaptors such that the first and second adaptors can be removably attached to the power cord in another embodiment. The first input voltage signal is approximately 115 volts and the second input voltage signal is approximately 230 volts in yet another embodiment. The welding-type apparatus includes the first adaptor and the second adaptor in other embodiments.

The power cord includes a non-standard electrical interface configured to interface with a complimentary non-standard electrical interface on the first and second adaptors in one embodiment. The non-standard electrical interface of the power cord comprises a plurality of pins and the non-standard complimentary electrical interface on each of the first and second adaptors comprises a plurality of sockets disposed to receive the plurality of pins in another embodiment.

According to a second aspect of the invention, a power cord for a welding-type power supply includes a first end configured for attachment to the welding-type power supply. A second end of the power cord is configured to interface with a first adaptor configured to receive a first input voltage signal and a second adaptor configured to receive a second input voltage signal. The second input voltage signal is different from the first input voltage signal in this embodiment.

The second end is configured to removably mate with the first and second adaptors such that the first and second adaptors can be removably attached to the power cord in one embodiment. The first input voltage is approximately 115 volts and the second input voltage is approximately 230 volts in another embodiment. The power cord includes the first adaptor and the second adaptor in other embodiments.

The second end includes a non-standard electrical interface configured to interface with a complimentary non-standard electrical interface on the first and second adaptors in one embodiment. The non-standard electrical interface of the power cord comprises a plurality of pins and the non-standard complimentary electrical interface on each of the first and second adaptors comprises a plurality of sockets disposed to receive the plurality of pins in another embodiment.

The second end includes a cavity disposed to receive an insulated adaptor body on the first and second adaptors in another embodiment such that when completely inserted into the cavity, the insulated adaptor body of the first and second adaptors extends out of the cavity.

The second end includes a pair of flexible sidewalls extending from the second end in another embodiment. Each of the pair of flexible sidewalls includes a locking lip disposed to cooperate with a complimentary locking ledge located on the first and second adaptors so as to capture the adaptor when the plurality of pins are received in the plurality of sockets in this embodiment.

The second end includes a pair of flexible sidewalls extending from the second end in another embodiment. Each of the pair of flexible sidewalls includes a locking lip disposed to engage a complimentary locking ledge located on the first and second adaptors in this embodiment.

According to a third aspect of the invention, an adaptor for use with a welding-type power supply power cord includes a first end and a second end. The first end has a non-standard electrical interface configured to mate with the power cord. The second end has a standard electrical interface configured to receive one of a plurality of input voltage signals.

The adaptor includes a pair of locking ledges disposed to cooperate with a pair of locking lips located on the power cord in one embodiment. Each of the locking lips engages a respective one of the locking ledges so as to capture the adaptor when the adaptor mates with the power cord in this embodiment. The adaptor is further configured to removably mate with the power cord such that the adaptor can be removably attached to the power cord in another embodiment.

According to a fourth aspect of the invention, a welding-type apparatus kit includes a power cord and first and second adaptors. The power cord is configured for attachment to a welding-type power supply. The first adaptor is configured to mate with the power cord and is configured to receive a first input voltage signal. The second adaptor is also configured to mate with the power cord and is configured to receive a second input voltage signal different from the first input voltage signal.

The power cord is further configured to removably mate with the first and second adaptors such that the first and second adaptors can be removably attached to the power cord in one embodiment. The power cord includes a non-standard electrical interface configured to mate with a complimentary non-standard electrical interface on the first and second adaptors in another embodiment. The first and second adaptors each include an insulated adaptor body and the power cord includes a cavity disposed to receive the insulated adaptor body such that when completely inserted into the cavity, the insulated adaptor body of the first and second adaptors extends out of the cavity in yet another embodiment.

The power cord includes a pair of flexible sidewalls in one other embodiment. Each of the pair of flexible sidewalls includes a locking lip disposed to engage a complimentary locking ledge located on the first and second adaptors in this embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power cord assembly configuration having particular features, the present invention is not limited to this configuration or to these features and other configurations and features can be used. Similarly, while the present invention will be illustrated with reference to its use in connection with a particular welding-type power supply having a particular configuration and particular features, other welding-type power supplies having other configurations and features can also be used with the power cord assembly of the present invention. The power cord assembly of the present invention is also not limited to use with welding-type power supplies, but rather can be used in other applications and with other devices including air conditioners, power tools and air compressors, etc . . .

As used herein, welding-type power supply includes plasma cutters and induction heaters as well as welding power supplies. Welding-type output signal as used herein includes output signals that are suitable for welding, plasma cutting or induction heating.

Generally, the present invention involves a power cord and a power cord assembly (or kit) for a welding-type power supply. The power cord assembly includes a power cord and a plurality of adaptors. In one embodiment, two adaptors are provided as part of the power cord assembly. In other embodiments, more than two adaptors are provided such as three four or five adaptors.

One end of the power cord is adapted for attachment to the welding-type power supply. The other end of the power cord is configured to receive a plurality of different input voltage signals via each of the plurality of adaptors. This end of the power cord includes a plug having a particular interface configuration. In one embodiment, the electrical interface configuration of the plug is a non-standard electrical interface configuration configured to mate with a complimentary non-standard electrical interface configuration on each of the plurality of adaptors. Each of the plurality of adaptors further includes a second standard electrical interface configuration for receiving one of the plurality of different input voltage signals from a wall outlet or other similar source.

Standard electrical interface configuration, as used herein, means one of the interface configurations (e.g., wall outlet configurations or plug and socket configurations) described in one or more of the following: 1) American National Standards Institute (ANSI) standard C73-73, 2) National Electrical Manufacturers Association (NEMA) standard WD6-88, or 3) International Electrotechnical Commission standard 60320, each of which may be amended from time to time. Nonstandard electrical interface configuration, as used herein, means an interface configuration that is not described in one of the three standards listed above.

The plug end of the power cord is mechanically configured to allow each of the adaptors to be removably attached when mated to the power cord in this embodiment. Removably attached or removably mated, as used herein, means that an adaptor can be removed (e.g., unmated) from the power cord in the field without modifying or damaging the power cord. In this way, an adaptor configured to receive a first input voltage signal can be removed from the power cord and replaced with a different adaptor configured to receive a different input voltage signal. Thus, the power cord has the capability to receive a plurality of input voltage signals without the need for either modifications to the power cord or replacement of the power cord.

Figure 1:
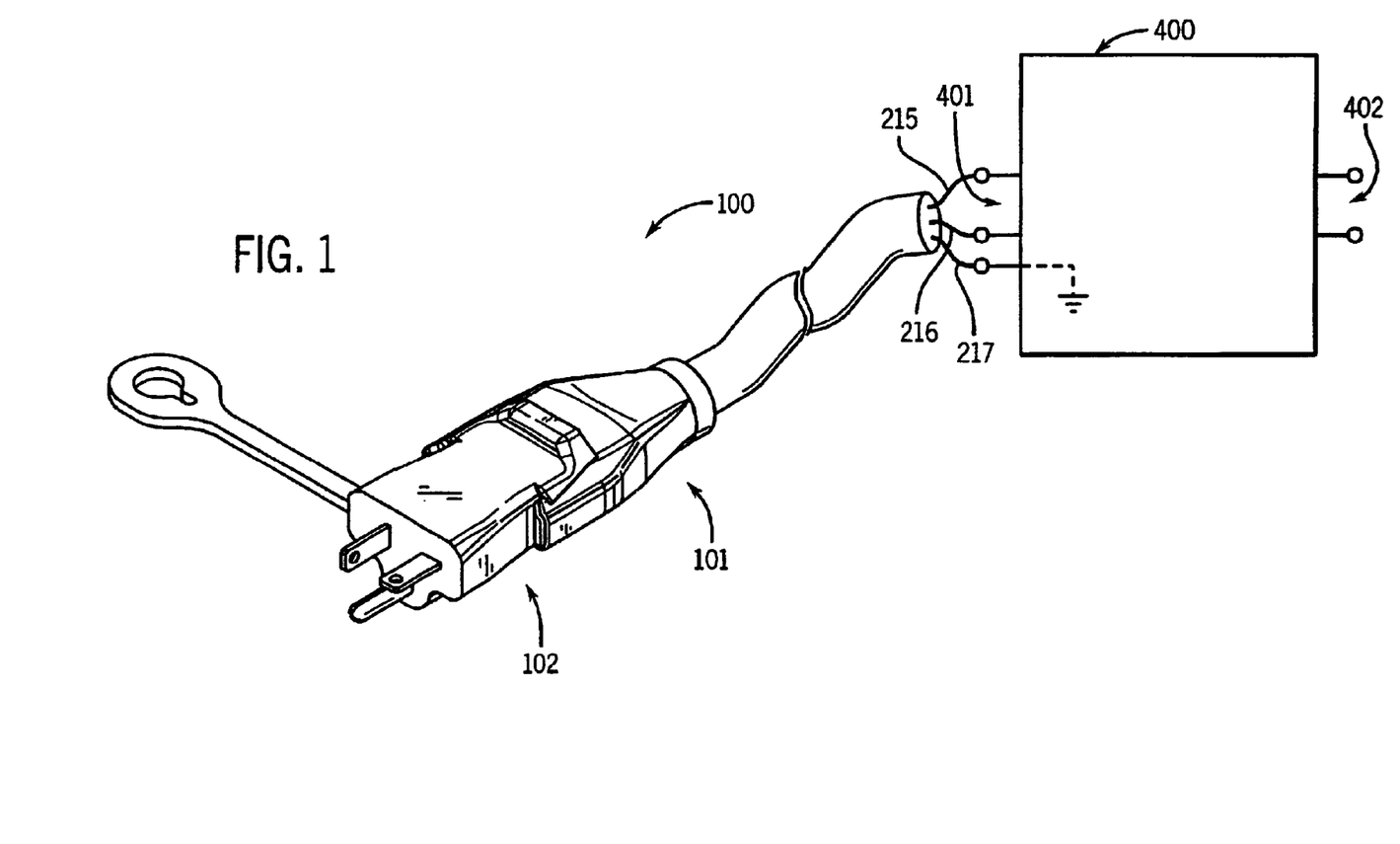
FIG. 1 shows an isometric view of the power cord assembly attached to a welding-type power supply according to one embodiment of the present invention.
Figure 2A:
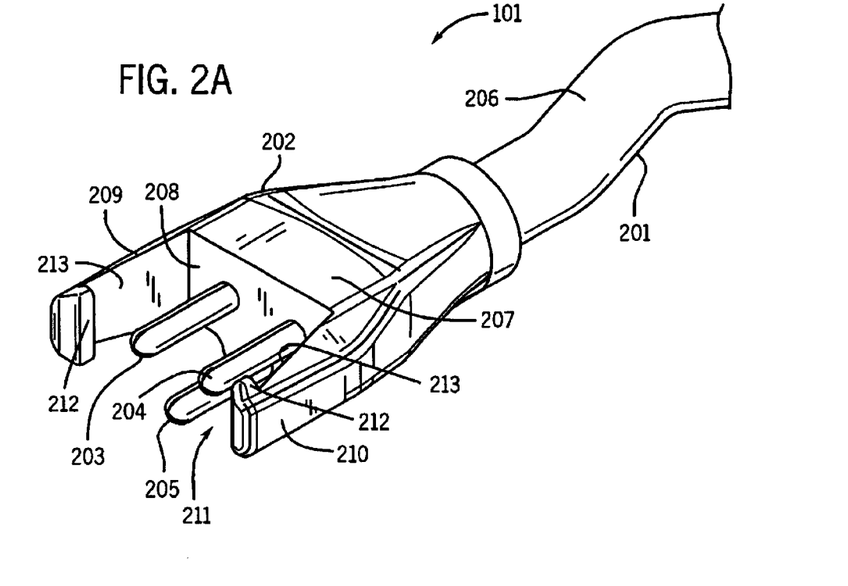
FIGS. 2a–d show various views of the power cord shown in the embodiment of FIG. 1.
Figure 2B:
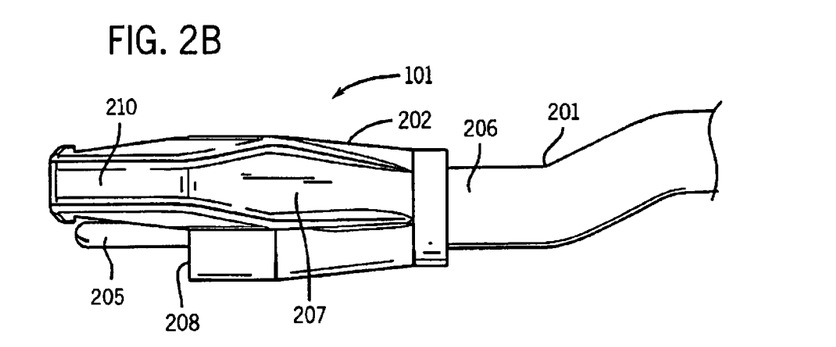
Figure 2C:
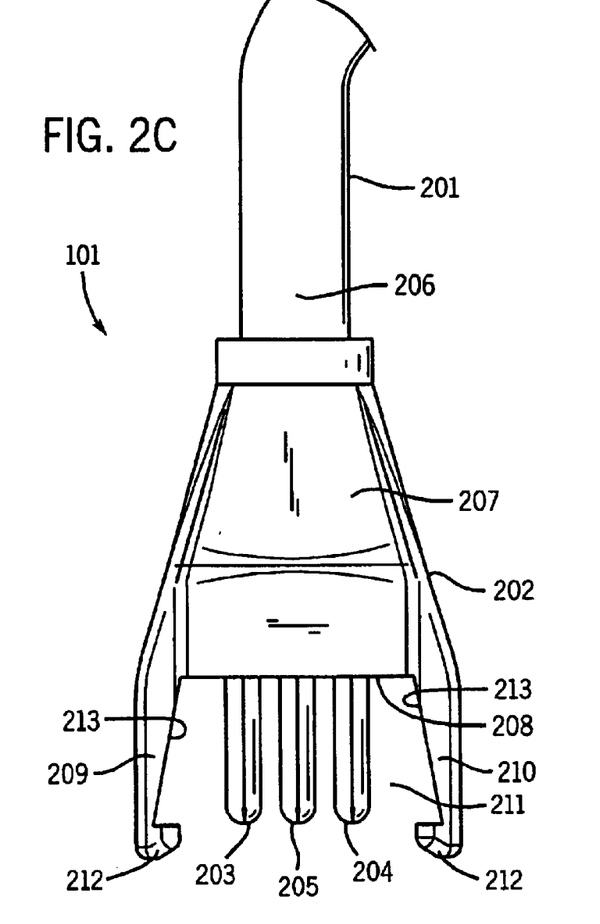
Figure 2D:
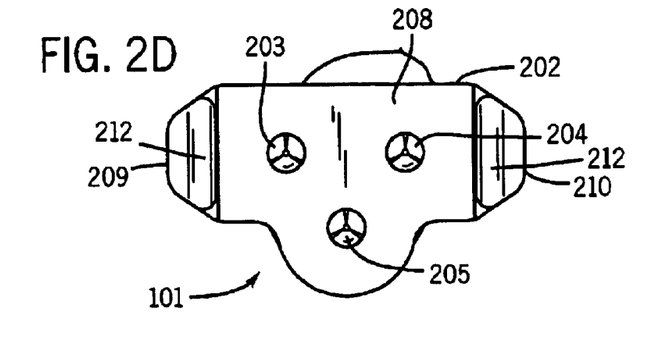

FIG. 1 shows a power cord assembly 100 (only one adaptor of which is shown in FIG. 1) attached to a welding-type power supply 400 according to one embodiment of the present invention. Power cord assembly 100 is configured to provide a plurality of input voltage signals to welding-type power supply 400 and includes a power cord 101 and a plurality of input adaptors 102 in this embodiment. One of the plurality of adaptors 102 is shown attached to power cord 101 in FIG. 1. The particular adaptor shown in FIG. 1 includes a United States standard electrical interface configuration for receiving a single-phase, 60 Hz, 115 volt line input voltage signal rated at 20 amperes. Each of the other adaptors that are part of power cord assembly 100 are configured to receive a different line input voltage signal.

Power cord 101, as shown in more detail in FIG. 2, includes an electrical cord 201, a plug 202, and a plurality of conductive pins 203–205. Cord 201 includes three insulated conductors 215–217, (see FIG. 1). Generally, one of the conductors is the live wire (e.g., hot wire), one is the neutral wire and one is the ground wire. The three insulated conductors 215–217 are encased in a flexible outer jacket 206.

One end of each of the three conductors 215–217 is connected to welding-type power supply 400 at one end of cord 201. The particular manner in which the conductors are physically connected to the welding-type power supply varies depending on the particular power supply being used. In one embodiment, for example, the ends of conductors 215–217 are terminated with lugs and the lugs are bolted to the power supply circuitry. In other embodiments, the ends of conductors 215–217 are soldered directly to the welding-type power supply circuitry.

The other end of each of the three conductors 215–217 is connected to a respective one of pins 203–205 at the other end of cord 201. The physical connection can be a crimp connection, a solder connection or any other type of suitable connection. In any event, plastic plug 202 is over molded onto the end of cord 201 and completely encases the connection between pins 203–205 and each of the respective insulated conductors 215–217.

Plug 202 in this embodiment includes a plug body 207, an end face 208 and a pair of opposing flexible sidewalls 209, 210. Cord 201 exits from one end of plug body 207. End face 208 is located at the other end of plug body 207. Sidewalls 209, 210 extend outward from plug body 207 on opposite sides of end face 208. A frustoconical shaped adaptor cavity 211 for receiving one of the adaptors 102 is defined by end face 208 and side walls 209, 210. In an alternative embodiment, sidewalls 209 and 210 are continuous with each other and completely encircle cavity 211. Each side wall 209, 210 includes an inwardly directed locking lip 212. These locking lips are provided to secure (e.g., capture) adaptor 102 in place in adaptor cavity 211 as will be described below.

Each of pins 203–205 extends into adaptor cavity 211 from end face 208. Pins 203–205 are arranged in a non-standard electrical interface configuration in this embodiment. In other embodiments, pins 203–205 are arranged in a standard electrical interface configuration.

Figure 3A:
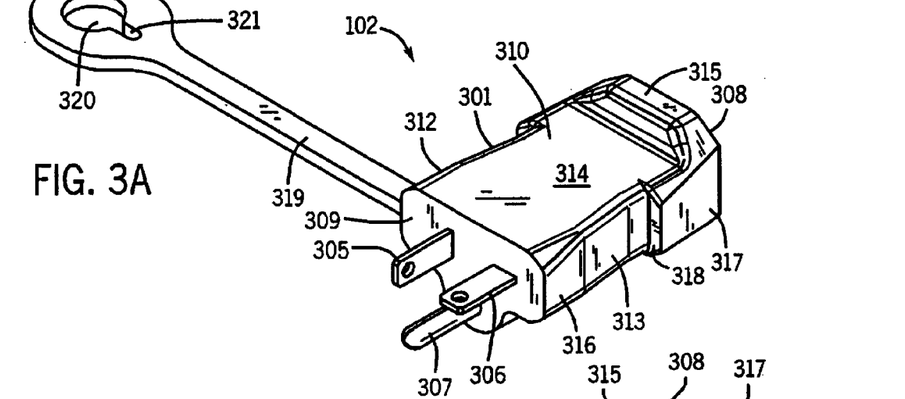
FIGS. 3a–c show various views of the adaptor shown in the embodiment of FIG. 1.
Figure 3B:
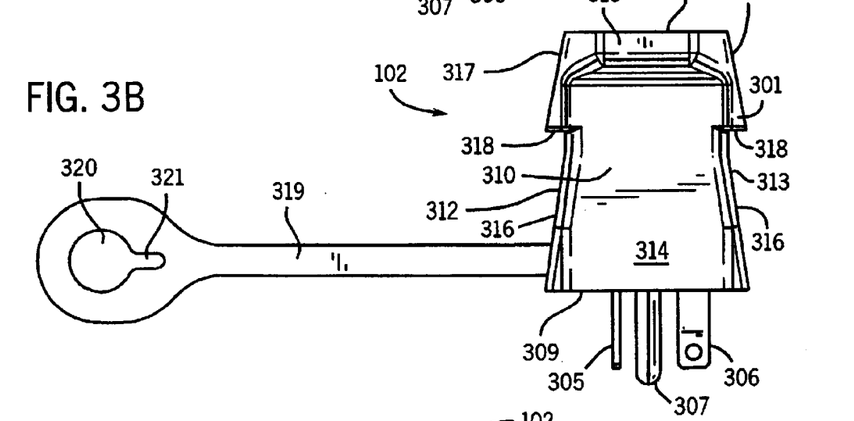
Figure 3C:
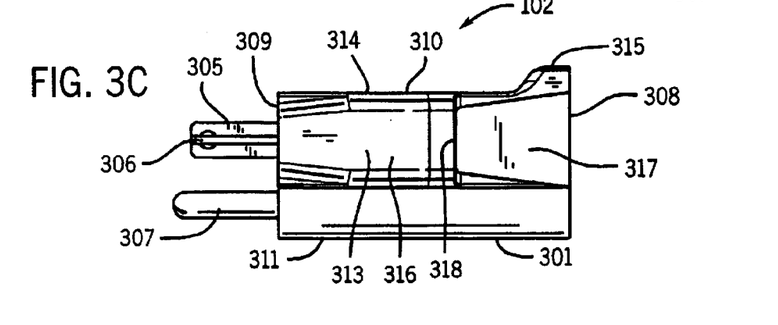
Figure 4A:
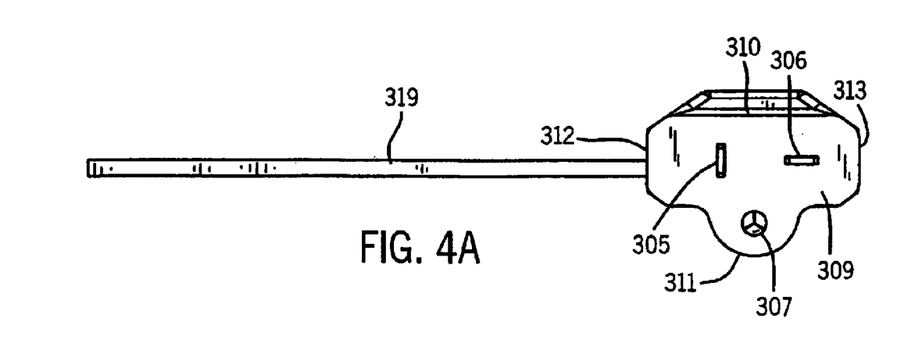
FIGS. 4a–c show end views of various adaptors according to one embodiment of the present invention.
Figure 4B:
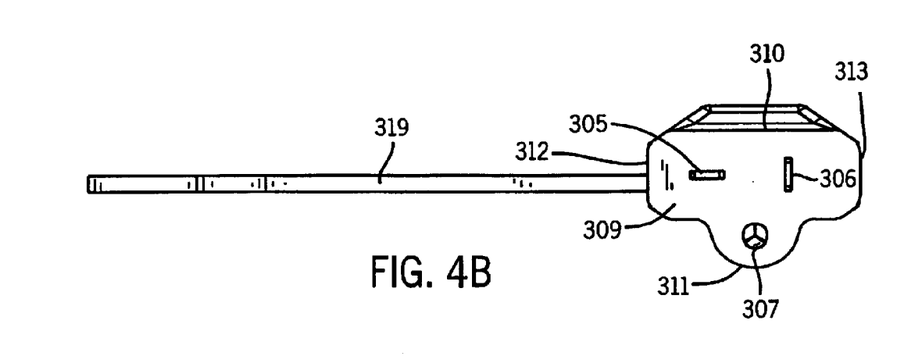
Figure 4C:
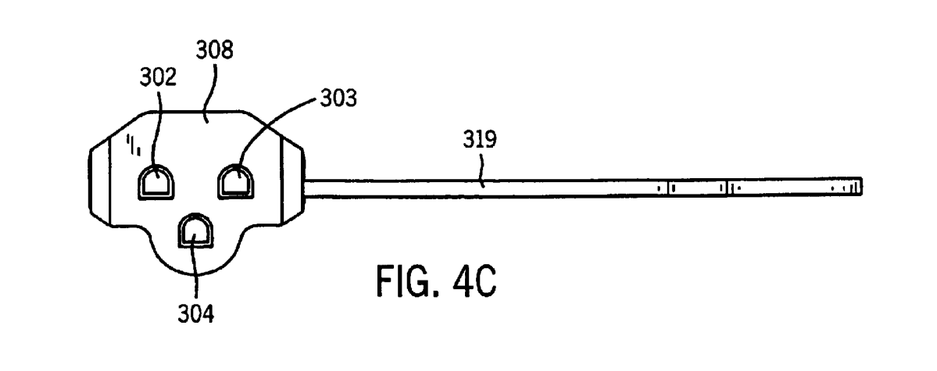

Adaptor 102 shown in FIG. 1 is shown in more detail in FIGS. 3 and 4 and includes a plastic insulated adaptor body 301, a plurality of electrically conductive sockets 302–304 (see FIG. 4(c)), a plurality of electrically conductive pins 305–307 and a security strap 319. Each of the conductive sockets 302–304 is connected (either soldered or crimped) to a respective one of the conductive pins 305–307. Adaptor body 301 is then over molded over the connections between sockets 302–304 and each of pins 305–307 to completely encase these connections inside of adaptor 102.

Adaptor body 301 includes a pair of opposing end faces 308, 309. Conductive sockets 302–304 protrude into adaptor body 301 from end face 308 at one end of adaptor 102. The configuration of sockets 302–304 on end face 308 is non-standard and is complimentary to the configuration of pins 203–205 protruding from end face 208 of plug 202 (see FIG. 4(c)). As a result, pins 203–205 can be received in sockets 302–304 when adaptor 102 is inserted into adaptor cavity 211 between sidewalls 209, 210 of plug 202. In other embodiments, both pins 203–205 and sockets 302–304 are configured in a standard electrical interface configuration.

In addition to being arranged in a non-standard configuration, pins 203–205 are also disposed on end face 208 in a manner that requires plug 102 to be properly oriented with respect to adaptor 102 to allow pins 203–205 to be received in sockets 302–304. More specifically, pins 204 and 205 are spaced closer together than are pins 203 and 204. Similarly, pins 203 and 205 are spaced closer together than are pins 203 and 204. Any attempt to insert pins 203–205 into sockets 302–304 with plug 202 rotated by 120 degrees in either direction will therefore result in a mismatch between pins 203–205 and sockets 302–304.

Conductive pins 305–307 extend outward from end face 309 at the other end of adaptor body 301. Conductive pins 305–307, unlike conductive pins 203–205, are arranged (e.g., configured) in a standard electrical interface configuration. Each of the plurality of adaptors 102 in power cord assembly 100 has a different standard electrical interface configuration for pins 305–307. The particular interface configuration of pins 305–307 on each adaptor 102 depends on the line input voltage signal to be provided to the welding-type power supply and on the particular standard electrical interface configuration used to receive that desired line input voltage signal. Different adaptors, therefore, have different pin configurations for pins 305–307.

Two standard electrical interface configurations for pins 305–307 are shown in FIG. 4. FIG. 4(a) shows pins 305–307 arranged in a standard electrical interface configuration for receiving a single-phase, 60 Hz, approximately 115 volt, 20 ampere line input signal in the United States. FIG. 4(b) shows pins 305–307 arranged in an interface configuration for receiving a single-phase, 60 Hz, approximately 230 volt, 20 ampere line input voltage signal in the United States. It should be understood that the present invention is not limited to these two interface configurations. Rather, the present invention can be used with any standard electrical interface configuration.

In addition to end faces 308, 309, adaptor body 301 also includes top and bottom surfaces 310, 311 and a pair of side surfaces 312, 313 disposed between top and bottom surfaces 310, 311. Top surface 310 includes a flat portion 314 and a raised blocking ledge 315. Blocking ledge 315 is disposed on one end of adaptor body 301 adjacent end face 308. The purpose for blocking ledge 315 is to prevent adaptor 102 from being inserted in an up-side-down manner into plug 202. Blocking ledge 315 prevents this from happening because it blocks pin 205 which in turn prevents pins 203–204 from being inserted into any of sockets 303–305.

Each side surface 312, 313 includes a first tapered portion 316, a second tapered portion 317 and an outwardly directed locking ledge 318 disposed between tapered portions 316 and 317. Each locking ledge 318 is disposed on adaptor body 301 to engage a locking lip 212 on sidewalls 209, 210 when adaptor 102 is received in adaptor cavity 211. The length of second tapered portion 317 is approximately equal to the length of tapered portion 213 of sidewalls 209, 210 such that adaptor 102 can be received and captured between sidewalls 209, 210 of plug 202. In its captured position, pins 203–205 are received in sockets 302–304 and locking lips 212 engage locking ledges 318.

To allow for easy removal of adaptor 102 from its captured position, first tapered portions 316 of adaptor body 301 extend outward (e.g., protrude) from cavity 211 beyond the end of sidewalls 209, 210 when adaptor 102 is completely captured or inserted in cavity 211. To replace adaptor 102 in the field with a different adaptor, flexible sidewalls 209, 210 are first spread apart to disengage locking lips 212 from locking ledges 318. The protruding portion of adaptor body 301 is then grasped and adaptor 102 is pulled away from plug 202 to disengage pins 203–205 from sockets 302–304. A new adaptor configured to receive a different desired input voltage signal can then be inserted into adaptor cavity 211 and the power cord is ready to receive the new desired input voltage signal.

It should be understood that the phrase extends outward from, or extends out of, when used herein in connection with an adaptor or an adaptor body and a cavity means to extend outward by a sufficient amount to allow the adaptor or adaptor body to be grasped for removal from the cavity. It should also be understood that although plug 202 and adaptor body 301 are shown with one type of mechanical interface configuration (e.g., inwardly directed locking lips 212 engaging outwardly directed locking ledges 318), the present invention is not limited to this particular mechanical interface configuration and other mechanical interface configurations can be used.

Security strap 319 is provided to allow adaptor 102 to remain with power cord 101 when adaptor 102 is not in use with plug 202. To accomplish this, cord 201 is inserted through opening 320 in security strap 319 (preferably before cord 201 is attached to a welding-type power supply). The length of strap 319 is sufficient to allow adaptor 102 to be inserted into cavity 211. When not in use, adaptor 102 slides out of the way along cord 201 but remains with power cord 101. Notch 321 in opening 320 is provided to allow opening 320 to accommodate cords of varying diameters.

FIG. 1 also shows a block diagram of power cord assembly 100 connected to welding-type power supply 400. Welding-type power supply 400 is configured to convert any of a plurality of input voltages received from power cord 101 into a welding-type output signal in this embodiment. Power supply 400 includes an input 401 connected to power cord 101 to receive the plurality of input voltage signals and an output 402 configured to provide the welding-type output signal.

The overall operation and construction of welding-type power supplies capable of converting a plurality of input voltage signals into a welding-type output signal are well understood by those of ordinary skill in the art. One such power supply is the MAXSTAR® 140STR welding power supply sold by Miller Electric Mfg. Co. of Appleton, Wis. Welding-type power supplies can include as part of their circuitry, microprocessors, analog and digital controllers, switches, other transformers, rectifiers, inverters, converters, choppers, comparators, phased controlled devices, buses, pre-regulators, diodes, inductors, capacitors, resistors, etc . . .

Numerous modifications may be made to the present invention which still fall within the intended scope hereof. Thus, it should be apparent that there has been provided in accordance with the present invention a power cord and power cord assembly for a welding-type power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type apparatus comprising:
   a power cord capable of providing a plurality of input voltage signals wherein the power cord is configured to interface with a first adaptor configured to receive a first input voltage signal from the plurality of input voltage signals and a second adaptor configured to receive a second input voltage signal from the plurality of input voltage signals different from the first input voltage signal; and a welding-type power supply attached to the power cord to receive any of the plurality of input voltage signals from the power cord.

2. The welding-type apparatus of claim 1 wherein the welding-type power supply is configured to convert any of the plurality of input voltage signals received from the power cord into a welding-type output signal.

3. The welding-type apparatus of claim 1 wherein the power cord is configured to removably mate with the first and second adaptors such that the first and second adaptors are removably attached to the power cord.

4. The welding-type apparatus of claim 3 wherein the first input voltage signal is approximately 115 volts and the second input voltage signal is approximately 230 volts.

5. The welding-type apparatus of claim 1 wherein the power cord includes a non-standard electrical interface configured to mate with a complimentary non-standard electrical interface on the first and second adaptors.

6. The welding-type apparatus of claim 5 wherein the non-standard electrical interface of the power cord comprises a plurality of pins and the non-standard complimentary electrical interface on each of the first and second adaptors comprises a plurality of sockets disposed to receive the plurality of pins.

7. The welding-type apparatus of claim 3 further including the first adaptor.

8. The welding-type apparatus of claim 7 further including the second adaptor.

9. A welding-type apparatus comprising:

a power cord having a first end and a second end wherein the power cord includes means for receiving a plurality of input voltage signals at the first end and further wherein the power cord is configured to provide any of the plurality of input voltage signals at the second end; and a welding-type power supply attached to the second end to receive any of the plurality of input voltage signals from the power cord.

10. The welding-type apparatus of claim 9 wherein the welding-type power supply is configured to convert any of the plurality of input voltage signals received from the power cord into a welding-type output signal.

11. A power cord for a welding-type power supply comprising:

a first end configured for attachment to the welding-type power supply;

a second end configured to interface with a first adaptor configured to receive a first input voltage signal and a second adaptor configured to receive a second input voltage signal different from the first input voltage signal; and wherein the second end is configured to removably mate with the first and second adaptors such that the first and second adaptors are removably attached to the power cord.

12. The power cord of claim 11 wherein the first input voltage is approximately 115 volts and the second input voltage is approximately 230 volts.

13. The power cord of claim 11 further including the first adaptor.

14. The power cord of claim 13 further including the second adaptor.

15. The power cord of claim 11 wherein the second end includes a non-standard electrical interface configured to interface with a complimentary non-standard electrical interface on the first and second adaptors.

16. The power cord of claim 15 wherein the non-standard electrical interface of the power cord comprises a plurality of pins and the non-standard complimentary electrical interface on each of the first and second adaptors comprises a plurality of sockets disposed to receive the plurality of pins.

17. The power cord of claim 16 wherein the second end includes a pair of flexible sidewalls extending from the second end, wherein each of the pair of flexible sidewalls includes a locking lip disposed to cooperate with a complimentary locking lodge located on the first and second adaptors so as to capture the adaptor when the plurality of pins are received in the plurality of sockets.

18. The power cord of claim 11 wherein the second end includes a cavity disposed to receive an insulated adaptor body on the first and second adaptors such that when completely inserted in to the cavity, the insulated adaptor body of the first and second adaptors extends out of the cavity.

19. The power cord of claim 11 therein the second end includes a pair of flexible sidewalls extending from the second end, wherein each of the pair of flexible sidewalls includes a locking lip disposed to engage a complimentary locking ledge located on the first and second adaptors.

20. A power cord for welding-type power supply comprising:

a first end configured for attachment to the welding-type power supply;

means for receiving a plurality of input voltage signals at a second end of the power cord; and removable means for interchanging the means for receiving a plurality of input voltage signals at the second end of the power cord.

21. The power cord of claim 20 further including means for electrically interfacing the second end with a first adaptor configured to receive a first input voltage signal from the plurality of input voltage signals and a second adaptor configured to receive a second input voltage signal from the plurality of input voltage signals different from the first input voltage signal.

22. An adaptor for use with a welding-type power supply power cord comprising;

a first end having a non-standard electrical interface configured to mate with the power cord;

a second end having a standard electrical interface configured to receive one of a plurality of input voltage signals; and wherein the adaptor is configured to removably mate with the power cord such that the adaptor is removably attached to the power cord.

23. The adaptor of claim 22 wherein the adaptor includes a pair of locking ledges disposed to cooperate with a pair of locking lips located on the power cord wherein each of the locking lips engages a respective one of the locking ledges so as to capture the adaptor when the adaptor mates with the power cord.

24. A welding-type apparatus kit comprising:

a power cord configured for attachment to a welding-type power supply;

a first adaptor configured to mate with the power cord wherein the first adaptor is further configured to receive a first input voltage signal; and a second adaptor configured to mate with the power cord wherein the second adaptor is further configured to receive a second input voltage signal different from the first input voltage signal.

25. The welding-type apparatus kit of claim 24 wherein the power cord is further configured to removably mate with the first and second adaptors such that the first and second adaptors are removably attached to the power cord.

26. The welding-type apparatus kit of claim 24 wherein the power cord includes a non-standard electrical interface configured to mate with a complimentary non-standard electrical interface on the first and second adaptors.

27. The welding-type apparatus kit of claim 24 wherein the first and second adaptors each include an insulated adaptor body and the power cord includes a cavity disposed to receive the insulated adaptor body such that when completely inserted into the cavity, the insulated adaptor body of the first and second adaptors extends out of the cavity.

28. The welding-type apparatus kit of claim 24 wherein the power cord includes a pair of flexible sidewalk wherein each of the pair of flexible sidewalk includes a locking lip disposed to engage a complimentary locking ledge located on the first and second adaptors.

* * * * *

UNITED STATES PATENT AND TRADEMARK OFFICE
CERTIFICATE OF CORRECTION

PATENT NO. : 6,720,527 B2
DATED : April 13, 2004
INVENTOR(S) : Gadamus et al.

It is certified that error appears in the above-identified patent and that said Letters Patent is hereby corrected as shown below:

<u>Column 10,</u>
Line 12, delete the word "lodge" and substitute therefore -- ledge --

<u>Column 12,</u>
Line 5, delete "sidewalk" and substitute therefore -- sidewalls --
Line 6, delete "sidewalk" and substitute therefore -- sidewalls --

Signed and Sealed this

First Day of June, 2004

JON W. DUDAS
*Acting Director of the United States Patent and Trademark Office*